US007643788B2

(12) United States Patent
Habaguchi et al.

(10) Patent No.: US 7,643,788 B2
(45) Date of Patent: Jan. 5, 2010

(54) METHOD AND SYSTEM FOR BROADCASTING DATA MESSAGES TO A VEHICLE

(75) Inventors: Masayuki Habaguchi, Rolling Hills Estates, CA (US); Tsuneo Ohno, Haga-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 740 days.

(21) Appl. No.: 11/232,311

(22) Filed: Sep. 20, 2005

(65) Prior Publication Data

US 2006/0068700 A1 Mar. 30, 2006

Related U.S. Application Data

(60) Provisional application No. 60/612,362, filed on Sep. 22, 2004, provisional application No. 60/612,347, filed on Sep. 22, 2004.

(51) Int. Cl.
*H04H 20/71* (2008.01)
*H04Q 1/30* (2006.01)
*H04W 4/06* (2009.01)
*H04H 20/74* (2008.01)

(52) U.S. Cl. ................ 455/3.03; 455/152.1; 455/414.1; 455/466; 455/3.02; 455/12.1; 340/539.1; 340/7.46; 701/30; 701/32

(58) Field of Classification Search ....................... None
See application file for complete search history.

(56) References Cited

U.S. PATENT DOCUMENTS 3,646,580 A 2/1972 Fuller et al.
4,404,639 A 9/1983 McGuire
4,989,146 A 1/1991 Imajo
5,157,714 A 10/1992 Spicer
5,173,691 A 12/1992 Sumner
5,182,555 A 1/1993 Sumner
5,359,529 A 10/1994 Snider (Continued)

FOREIGN PATENT DOCUMENTS

EP 0973299 1/2000

(Continued)

OTHER PUBLICATIONS

"The Application of a Novel Two-Way Mobile Satellite Communications and Vehicle Tracking System to the Transportation Industry", Jacobs et al., Feb. 1991, IEEE Transactions on Vehicular Technology, vol. 40, No. 1, pp. 57-63.

(Continued)

*Primary Examiner*—Philip J Sobutka
(74) *Attorney, Agent, or Firm*—Plumsea Law Group, LLC

(57) ABSTRACT

The invention provides systems and methods for targeting broadcast messages to particular vehicles or classes of vehicles. In one embodiment, the system comprises an information center for creating and sending a broadcast data message, and a relay section that receives the broadcast data message and relays the message to a plurality of vehicles. The information center typically comprises a one-to-many communication system for sending the message from one source to a plurality of receivers, such as a satellite radio network or the like. The message can be deleted or modified in response to commands received by the receiver.

11 Claims, 14 Drawing Sheets

U.S. PATENT DOCUMENTS 5,388,045 A 2/1995 Kamiya et al.
5,420,794 A 5/1995 James
5,442,553 A 8/1995 Parrillo
5,445,347 A 8/1995 Ng
5,506,773 A 4/1996 Takaba et al.
5,508,931 A 4/1996 Snider
5,546,305 A 8/1996 Kondo
5,551,064 A 8/1996 Nobbe et al.
5,563,788 A 10/1996 Yoon
5,590,040 A 12/1996 Abe et al.
5,635,924 A 6/1997 Tran et al.
5,636,245 A 6/1997 Ernst et al.
5,648,768 A 7/1997 Bouve
5,649,300 A 7/1997 Snyder et al.
5,661,787 A 8/1997 Pocock
5,664,948 A 9/1997 Dimitriadis et al.
5,671,195 A 9/1997 Lee
5,682,525 A 10/1997 Bouve et al.
5,696,676 A 12/1997 Takaba
5,699,056 A 12/1997 Yoshida
5,757,645 A 5/1998 Schneider et al.
5,774,827 A 6/1998 Smith et al.
5,802,545 A 9/1998 Coverdill
5,862,510 A 1/1999 Saga et al.
5,864,305 A 1/1999 Rosenquist
5,878,056 A 3/1999 Black et al.
5,892,463 A 4/1999 Hikita et al.
5,926,108 A 7/1999 Wicks et al.
5,931,878 A 8/1999 Chapin, Jr.
5,959,577 A 9/1999 Fan et al.
5,964,811 A 10/1999 Ishii et al.
5,982,298 A 11/1999 Lappenbusch et al.
5,999,882 A 12/1999 Simpson et al.
6,032,046 A 2/2000 Nakano
6,073,007 A * 6/2000 Doyle ...................... 455/412.2
6,078,865 A 6/2000 Koyanagi
6,085,146 A 7/2000 Kuribayashi et al.
6,111,521 A 8/2000 Mulder et al.
6,169,894 B1 1/2001 McCormick et al.
6,195,602 B1 2/2001 Hazama et al.
6,208,935 B1 3/2001 Yamada et al.
6,212,388 B1 4/2001 Seo
6,236,330 B1 5/2001 Cohen
6,240,364 B1 5/2001 Kerner et al.
6,243,647 B1 6/2001 Berstis et al.
6,246,320 B1 6/2001 Monroe
6,266,607 B1 7/2001 Meis et al.
6,266,608 B1 7/2001 Pertz
6,292,723 B1 9/2001 Brogan et al.
6,297,748 B1 10/2001 Lappenbusch et al.
6,308,120 B1 10/2001 Good
6,317,686 B1 11/2001 Ran
6,329,925 B1 12/2001 Skiver et al.
6,330,499 B1 12/2001 Chou et al.
6,335,729 B2 1/2002 Nunokawa et al.
6,339,736 B1 1/2002 Moskowitz et al.
6,351,709 B2 2/2002 King et al.
6,356,822 B1 3/2002 Diaz et al.
6,362,730 B2 3/2002 Razavi et al.
6,370,454 B1 4/2002 Moore
6,373,883 B1 4/2002 Sorensen et al.
6,381,533 B1 4/2002 Crane et al.
6,389,337 B1 5/2002 Kolls
6,397,067 B1 5/2002 Tanaka et al.
6,408,307 B1 6/2002 Semple et al.
6,421,593 B1 7/2002 Kempen et al.
6,434,455 B1 8/2002 Snow et al.
6,438,490 B2 8/2002 Ohta
6,459,961 B1 10/2002 Obradovich et al.
6,477,452 B2 11/2002 Good
6,480,105 B2 11/2002 Edwards
6,480,145 B1 11/2002 Hasegawa
6,510,317 B1 1/2003 Marko et al.
6,522,250 B1 2/2003 Ernst et al.
6,526,335 B1 2/2003 Treyz et al.
6,529,143 B2 3/2003 Mikkola et al.
6,539,269 B1 3/2003 Jarrow et al.
6,539,302 B1 3/2003 Bender et al.
6,542,794 B2 4/2003 Obradovich et al.
6,542,822 B1 4/2003 Froeberg
6,549,833 B2 4/2003 Katagishi et al.
6,552,682 B1 4/2003 Fan
6,553,289 B2 4/2003 Maki et al.
6,553,290 B1 4/2003 Pillar
6,553,308 B1 4/2003 Uhlmann et al.
6,553,313 B1 4/2003 Froeberg
6,577,934 B2 6/2003 Matsunaga et al.
6,583,734 B2 6/2003 Bates et al.
6,587,759 B2 7/2003 Obradovich et al.
6,587,777 B1 7/2003 St. Pierre
6,587,787 B1 7/2003 Yokota
6,590,507 B2 7/2003 Burns
6,594,576 B2 7/2003 Fan et al.
6,597,904 B1 7/2003 Neustein
6,603,405 B2 8/2003 Smith
6,604,038 B1 8/2003 Leseky et al.
6,609,004 B1 8/2003 Morse et al.
6,611,201 B1 8/2003 Bishop et al.
6,611,740 B2 8/2003 Lowrey et al.
6,611,753 B1 8/2003 Millington
6,615,130 B2 9/2003 Myr
6,615,133 B2 9/2003 Boies et al.
6,615,186 B1 9/2003 Kolls
6,618,669 B2 9/2003 Ota et al.
6,633,238 B2 10/2003 Lemelson et al.
6,636,721 B2 10/2003 Threadgill et al.
6,647,417 B1 11/2003 Hunter et al.
6,654,600 B1 11/2003 Pollak et al.
6,657,558 B2 12/2003 Horita et al.
6,658,485 B1 12/2003 Baber et al.
6,662,090 B2 12/2003 Toyama et al.
6,662,091 B2 12/2003 Wilson et al.
6,664,922 B1 12/2003 Fan
6,668,219 B2 12/2003 Hwang et al.
6,677,854 B2 1/2004 Dix
6,680,694 B1 1/2004 Knockeart et al.
6,681,120 B1 1/2004 Kim
6,691,025 B2 2/2004 Reimer
6,697,633 B1 2/2004 Dogan et al.
6,701,231 B1 3/2004 Borugian
6,701,232 B2 3/2004 Yamaki
6,707,421 B1 3/2004 Drury et al.
6,711,398 B1 3/2004 Talaie et al.
6,714,797 B1 3/2004 Rautila
6,720,920 B2 4/2004 Breed et al.
6,721,685 B2 4/2004 Kodama
6,724,827 B1 4/2004 Patsiokas et al.
6,730,940 B1 5/2004 Steranka et al.
6,732,031 B1 5/2004 Lightner et al.
6,735,416 B1 5/2004 Marko et al.
6,735,504 B2 5/2004 Katagishi et al.
6,738,697 B2 5/2004 Breed
6,741,188 B1 5/2004 Miller et al.
6,741,834 B1 5/2004 Godwin
6,748,317 B2 6/2004 Maruyama et al.
6,754,485 B1 6/2004 Obradovich et al.
6,754,570 B2 6/2004 Iihoshi et al.
6,757,712 B1 6/2004 Bastian et al.
6,785,551 B1 8/2004 Richard
6,798,358 B2 9/2004 Joyce et al.
6,804,490 B2 10/2004 Cook et al.
6,804,589 B2 10/2004 Foxford et al.
6,810,323 B1 10/2004 Bullock et al.
6,812,860 B1 11/2004 Schwarzalder, Jr.

| | | | |
|---|---|---|---|
| 6,812,888 | B2 | 11/2004 | Drury et al. |
| 6,813,549 | B2 | 11/2004 | Good |
| 6,816,778 | B2 | 11/2004 | Diaz |
| 6,819,986 | B2 | 11/2004 | Hong et al. |
| 6,823,169 | B2 | 11/2004 | Marko et al. |
| 6,823,263 | B1 | 11/2004 | Kelly et al. |
| 6,836,667 | B1 | 11/2004 | Smith, Jr. |
| 6,836,539 | B2 | 12/2004 | Katou et al. |
| 6,847,871 | B2 | 1/2005 | Malik et al. |
| 6,847,872 | B2 | 1/2005 | Bodin et al. |
| 6,847,889 | B2 | 1/2005 | Park et al. |
| 6,850,823 | B2 | 2/2005 | Eun et al. |
| 6,859,720 | B2 | 2/2005 | Satoh et al. |
| 6,870,487 | B2 | 3/2005 | Nuesser et al. |
| 6,871,067 | B2 | 3/2005 | Clark et al. |
| 6,901,374 | B1 | 5/2005 | Himes |
| 6,911,918 | B2 | 6/2005 | Chen |
| 6,920,382 | B2 | 7/2005 | Katagishi et al. |
| 6,928,423 | B1 | 8/2005 | Yamanaka |
| 6,944,430 | B2 | 9/2005 | Bertstis |
| 6,971,070 | B2 | 11/2005 | Obradovich et al. |
| 6,983,200 | B2 | 1/2006 | Bodin et al. |
| 6,987,964 | B2 | 1/2006 | Obradovich et al. |
| 6,988,034 | B1 | 1/2006 | Marlatt et al. |
| 6,993,421 | B2 | 1/2006 | Pillar et al. |
| 6,995,686 | B2 | 2/2006 | Gosdin et al. |
| 7,010,297 | B2 | 3/2006 | Yokota |
| 7,170,390 | B2 | 1/2007 | Quinones et al. |
| 7,174,301 | B2 | 2/2007 | Florence et al. |
| 7,184,866 | B2 | 2/2007 | Squires et al. |
| 7,210,142 | B2 | 4/2007 | Hilt et al. |
| 7,216,109 | B1 | 5/2007 | Donner |
| 7,292,848 | B2 | 11/2007 | Mazzara et al. |
| 7,307,513 | B2 | 12/2007 | Shutter et al. |
| 2001/0001848 | A1 | 5/2001 | Oshizawa et al. |
| 2002/0002534 | A1 | 1/2002 | Davis et al. |
| 2002/0016655 | A1 | 2/2002 | Jao |
| 2002/0029339 | A1 | 3/2002 | Rowe |
| 2002/0032507 | A1 | 3/2002 | Diaz et al. |
| 2002/0044049 | A1 | 4/2002 | Saito et al. |
| 2002/0049531 | A1 | 4/2002 | Tanaka et al. |
| 2002/0067289 | A1 | 6/2002 | Smith |
| 2002/0072378 | A1 | 6/2002 | Gaal |
| 2002/0073012 | A1 | 6/2002 | Lowell et al. |
| 2002/0077741 | A1 | 6/2002 | Hanebrink |
| 2002/0080022 | A1 | 6/2002 | Edwards |
| 2002/0087237 | A1 | 7/2002 | Ol et al. |
| 2002/0103582 | A1 | 8/2002 | Ohmura et al. |
| 2002/0103583 | A1 | 8/2002 | Ohmura et al. |
| 2002/0103597 | A1 | 8/2002 | Takayama et al. |
| 2002/0152021 | A1 | 10/2002 | Ota et al. |
| 2002/0152115 | A1 | 10/2002 | Morita et al. |
| 2002/0156692 | A1 | 10/2002 | Squeglia |
| 2002/0161495 | A1 | 10/2002 | Yamaki |
| 2002/0161841 | A1 | 10/2002 | Kinnunen |
| 2002/0165662 | A1 | 11/2002 | Maruyama et al. |
| 2002/0165665 | A1 | 11/2002 | Kim |
| 2002/0176494 | A1 | 11/2002 | Zhao et al. |
| 2002/0177926 | A1 | 11/2002 | Lockwood et al. |
| 2002/0193923 | A1 | 12/2002 | Toyama et al. |
| 2002/0198632 | A1 | 12/2002 | Breed et al. |
| 2002/0198637 | A1 | 12/2002 | Shibata |
| 2003/0028297 | A1 | 2/2003 | Iihoshi et al. |
| 2003/0051239 | A1 | 3/2003 | Hudspeth |
| 2003/0063628 | A1 | 4/2003 | Marko et al. |
| 2003/0069683 | A1 | 4/2003 | Lapidot |
| 2003/0081587 | A1 | 5/2003 | Ichiyoshi |
| 2003/0083813 | A1 | 5/2003 | Park |
| 2003/0093476 | A1 | 5/2003 | Syed |
| 2003/0095038 | A1 | 5/2003 | Dix |
| 2003/0098782 | A1 | 5/2003 | Eastman et al. |
| 2003/0109972 | A1 | 6/2003 | Tak |
| 2003/0117982 | A1 | 6/2003 | Minnick |
| 2003/0158640 | A1 | 8/2003 | Pillar et al. |
| 2003/0169182 | A1 | 9/2003 | Wilhelm et al. |
| 2003/0191583 | A1 | 10/2003 | Uhlmann et al. |
| 2003/0195695 | A1 | 10/2003 | Maruyama et al. |
| 2003/0195814 | A1 | 10/2003 | Striemer |
| 2003/0216859 | A1 | 11/2003 | Martell et al. |
| 2003/0225516 | A1 | 12/2003 | DeKock et al. |
| 2003/0229441 | A1 | 12/2003 | Pechatnikov et al. |
| 2003/0236613 | A1 | 12/2003 | Satoh et al. |
| 2004/0012501 | A1 | 1/2004 | Mazzara et al. |
| 2004/0024753 | A1 | 2/2004 | Chane et al. |
| 2004/0044605 | A1 | 3/2004 | Kress Bodin et al. |
| 2004/0059781 | A1 | 3/2004 | Yoakum et al. |
| 2004/0068362 | A1 | 4/2004 | Maekawa et al. |
| 2004/0068364 | A1 | 4/2004 | Zhao et al. |
| 2004/0073356 | A1 | 4/2004 | Craine |
| 2004/0075774 | A1 | 4/2004 | Chang et al. |
| 2004/0080430 | A1 | 4/2004 | Videtich |
| 2004/0085198 | A1 | 5/2004 | Saito et al. |
| 2004/0093243 | A1 | 5/2004 | Bodin |
| 2004/0102898 | A1 | 5/2004 | Yokota et al. |
| 2004/0104842 | A1 | 6/2004 | Drury et al. |
| 2004/0110515 | A1 | 6/2004 | Blumberg et al. |
| 2004/0148099 | A1 | 7/2004 | Kim |
| 2004/0167707 | A1 | 8/2004 | Bragansa et al. |
| 2004/0198217 | A1 | 10/2004 | Lee et al. |
| 2004/0203630 | A1 | 10/2004 | Wang |
| 2004/0204821 | A1 | 10/2004 | Tu |
| 2004/0204842 | A1 | 10/2004 | Shinozaki |
| 2004/0208204 | A1 | 10/2004 | Crinon |
| 2004/0233070 | A1 | 11/2004 | Finnern |
| 2004/0233101 | A1 | 11/2004 | Kim |
| 2004/0239531 | A1 | 12/2004 | Adamczyk |
| 2004/0249529 | A1 | 12/2004 | Kelly et al. |
| 2004/0249530 | A1 | 12/2004 | Kelly et al. |
| 2004/0249531 | A1 | 12/2004 | Kelly et al. |
| 2004/0249532 | A1 | 12/2004 | Kelly et al. |
| 2004/0252197 | A1 | 12/2004 | Fraley et al. |
| 2004/0260786 | A1 | 12/2004 | Barile |
| 2005/0001743 | A1 | 1/2005 | Haemerle |
| 2005/0015186 | A1 | 1/2005 | Kelly et al. |
| 2005/0015199 | A1 | 1/2005 | Lokshin et al. |
| 2005/0021197 | A1 | 1/2005 | Zimmerman et al. |
| 2005/0021199 | A1 | 1/2005 | Zimmerman et al. |
| 2005/0027436 | A1 | 2/2005 | Yoshikawa et al. |
| 2005/0027449 | A1 | 2/2005 | Marsh |
| 2005/0033511 | A1 | 2/2005 | Pechatnikov et al. |
| 2005/0038581 | A1 | 2/2005 | Kapolka et al. |
| 2005/0038596 | A1 | 2/2005 | Yang et al. |
| 2005/0043880 | A1 | 2/2005 | Yamane et al. |
| 2005/0060070 | A1 | 3/2005 | Kapolka et al. |
| 2005/0065678 | A1 | 3/2005 | Smith et al. |
| 2005/0068174 | A1 | 3/2005 | Oesterling et al. |
| 2005/0075095 | A1 | 4/2005 | Dillon |
| 2005/0080519 | A1 | 4/2005 | Oesterling et al. |
| 2005/0090951 | A1 | 4/2005 | Good |
| 2005/0096811 | A1 | 5/2005 | Bodin et al. |
| 2005/0125117 | A1 | 6/2005 | Breed |
| 2005/0131626 | A1 | 6/2005 | Ignatin |
| 2005/0137763 | A1 | 6/2005 | Watkins |
| 2005/0137790 | A1 | 6/2005 | Yamada et al. |
| 2005/0222760 | A1 | 10/2005 | Cabral et al. |
| 2005/0273218 | A1 | 12/2005 | Breed et al. |
| 2005/0288856 | A1 | 12/2005 | Uyeki et al. |
| 2006/0055565 | A1 | 3/2006 | Kawamata et al. |
| 2006/0116800 | A1 | 6/2006 | Obradovich et al. |
| 2008/0088480 | A1 | 4/2008 | Rozum et al. |
| 2008/0106436 | A1 | 5/2008 | Breed |

FOREIGN PATENT DOCUMENTS

| | | |
|---|---|---|
| JP | 6276056 | 9/1994 |
| JP | 8149029 | 6/1996 |

| | | |
|---|---|---|
| JP | 10-150477 | 6/1998 |
| JP | 2000201104 | 7/2000 |
| JP | 2000293788 | 10/2000 |
| JP | 2001168743 | 6/2001 |
| JP | 2001-216555 | 8/2001 |
| JP | 2002-032276 | 1/2002 |
| JP | 2002-077295 | 3/2002 |
| JP | 2002-084298 | 3/2002 |
| JP | 2002-318844 | 10/2002 |

OTHER PUBLICATIONS

"The Flawed Future of Radio", Acidus' Article Published in 2600 Magazine; Release date Jan. 15, 2003; 5 pages.
"Sirius Satellite Radio—Help", Help, dated Oct. 6, 2002 by archive.org; 8 pages.

* cited by examiner

Standard Type Source Data

1 to 1 Linked Type Source Data

Header for Single Packet

| Sync Byte | Packet Type | Payload Length (Source Data Length) | Data Serial Number | Header CRC |
|---|---|---|---|---|
| 1 Byte | 1 Byte | 1-4 Bytes | 4 Bytes | 2 Bytes |

FIG. 11

Header for Multi Packet

| Sync Byte | Packet Type | Total Packet Quantity | Packet Serial Number | Source Data Length | Payload Length | Data Serial Number | Header CRC |
|---|---|---|---|---|---|---|---|
| 1 Byte | 1 Byte | 1 Byte | 1 Byte | 1-4 Bytes | 1-4 Bytes | 4 Bytes | 2 Bytes |

FIG. 12

Reserved.
Sender should set 0.

| bit 7 | bit 6 | bit 5 | bit 4 | bit 3 | bit 2 | bit 1 | bit 0 |
|---|---|---|---|---|---|---|---|
| | | | 0 | | | | |

| bit 3 | bit 2 | Number of bytes for notifying payload size. |
|---|---|---|
| 0 | 0 | 1 Byte |
| 0 | 1 | 2 Byte |
| 1 | 0 | 3 Byte |
| 1 | 1 | 4 Byte |

| bit 1 | bit 0 | Number of bytes for notifying Broadcast Source Data size. |
|---|---|---|
| 0 | 0 | 1 Byte |
| 0 | 1 | 2 Byte |
| 1 | 0 | 3 Byte |
| 1 | 1 | 4 Byte |

| bit 5 | Optional Broadcast Source Data CRC |
|---|---|
| 0 | Not present |
| 1 | Present |

| bit 7 | bit 6 | Type of source data division |
|---|---|---|
| 0 | 0 | Single packet standard type source data |
| 0 | 1 | Single packet 1 to 1 linked type source data |
| 1 | 0 | Multi packet standard type source data |
| 1 | 1 | Reserved |

FIG. 13

METHOD AND SYSTEM FOR BROADCASTING DATA MESSAGES TO A VEHICLE

RELATED APPLICATION INFORMATION

This application claims the benefit pursuant to 35 U.S.C. § 119(e) of U.S. Provisional Application Ser. No. 60/612,362, titled "Method and System for Broadcasting Data Messages to a Single Vehicle as a Target," filed on Sep. 22, 2004, and to U.S. Provisional Application Ser. No. 60/612,347, titled "Method and System for Broadcasting Messages to Vehicles with Delete Command," filed on Sep. 22, 2004, the contents of each of which are incorporated in their entirety into this disclosure by reference.

BACKGROUND OF THE INVENTION

1. Field of the Invention

The present invention relates to a method and system for communicating information to vehicles from a remote location, and more particularly, to a method and system for broadcasting messages that are intended for a single vehicle. The present invention also relates to a method and system for broadcasting messages to a vehicle including a delete command permitting remote editing of the message.

2. Description of Related Art

There are many instances in which it is desirable to communicate messages to the operator of a vehicle. For example, vehicle manufactures may wish to communicate messages to the vehicle operator to provide reminders to perform periodic maintenance. The upkeep and maintenance of vehicles is essential to maintain a vehicle in good running condition and to maintain the overall reputation of a vehicle manufacturer. If a vehicle malfunctions or breaks down because of user neglect, as opposed to a vehicle defect, not only is the vehicle operator inconvenienced, the reputation of the vehicle manufacturer will be harmed. Thus, as users often neglect to regularly service their vehicles, upgrade their vehicles with improved replacement parts, and in some cases, even forget to replace recalled vehicle parts—it is important to remind users to service their vehicles. In addition to such reminders, vehicle manufacturers may also wish to communicate with vehicle operators regarding lease and loan status, special discounts for vehicle service and replacement parts, and vehicle recall notices.

It is known in the art to communicate broadcast messages using radio signals to many members of the general public. Such messages are not specific to certain vehicle owners, and instead may be received by all vehicle operators within a particular geographic area. For example, a radio station may broadcast a news or entertainment audio program along with an embedded data track that contains an identification of the radio station, the name of the artist or song, and other textual information. A drawback of such information broadcasting systems is that the broadcast messages are communicated to all members of the public, and cannot be targeted for receipt only by specific members of the public, e.g., owners of certain makes/models of vehicles, or for owners of specific vehicles. While other known methods may be used to communicate targeted messages to certain vehicle owners, such as direct mail, telephone and email, there presently exists no way to send targeted electronic messages directly to a vehicle.

As a result, there remains a need for methods and systems that allow for the broadcasting of messages that are targeted for a single vehicle or a single type of vehicle.

Radio broadcast messages may include both audio and visual display information. For example, a radio station may broadcast a news or entertainment audio program along with an embedded data track that contains an identification of the radio station, the name of the artist or song, and other textual information. This information would be displayed on a visual display within the vehicle. Notably, both the audio and video information is presented continuously to the vehicle operator, i.e., the audio and video information cannot be captured for later presentation.

These known information broadcasting systems are unsuitable for communicating specific messages to the vehicle operator for a number of reasons. First, as noted above, the broadcast messages are communicated to all members of the public, and cannot be targeted for receipt only by specific members of the public, e.g., owners of certain makes/models of vehicles. Second, the vehicle operator cannot capture the audio and visual broadcasts for later presentation, such as at a later time when the vehicle is not in motion and it is convenient to review the broadcast message. The audio and visual broadcasts are presented in real time, and if the vehicle operator misses them there is no recourse. Of course, since the messages are not used to convey important information, and are limited to advertising messages and the like, there has heretofore been no reason to capture them. Third, the broadcasting systems have no way to recall or change a broadcast message communicated to the vehicle after it has been sent. A broadcast message may erroneously contain incorrect information or information that has already become stale. Although the information broadcasting systems could simply rebroadcast additional corrected messages, this proliferation of messages to the vehicle operator represents an irritation that the information broadcasting systems would be keen to avoid.

As a result, there remains a need for methods that allow for the targeted transmission of broadcast messages to vehicle operators in a manner that permits selective playback by vehicle operators, and that allow for the subsequent correction of already broadcasted messages.

SUMMARY OF THE INVENTION

The present invention provides a system and method for targeting broadcast messages to particular vehicles or classes of vehicles. While broadcast messages have been used to deliver messages and news items to vehicles in a particular geographic region or to satellite radio subscribers, there has not heretofore been a system for targeting particular vehicles with broadcast messages that are vehicle specific (e.g., vehicle recall information, service reminders, etc.).

In accordance with one aspect of the embodiments described herein, there is provided a system for communicating information to one or more vehicles from a remote location. The system generally comprises an information center for generating and sending a broadcast data message, and a relay section that receives the broadcast data message and relays the message to the vehicles. The information center typically comprises a one-to-many communication system for sending information from one source to a plurality of receivers.

In accordance with another aspect of the embodiments described herein, there is provided a system for receiving a broadcast data message, wherein the system generally comprises a receiver for receiving the message. The receiver preferably comprises a filter processing section that reads a filter code section of the broadcast data message to determine whether the vehicle is an intended recipient of the message portion.

In accordance with yet another aspect of the embodiments described herein, there is provided a method for creating and broadcasting a single-packet broadcast data message to at least one vehicle, comprising receiving a data packet directed to the at least one vehicle having a characteristic, and generating a filter code section based on the characteristic, and concatenating the data packet and the filter code to generate a broadcast data portion. The broadcast data portion is concatenated with a header to generate the single-packet broadcast data message, which is broadcast via a one-to-many communication system, such as a satellite radio system. Similarly, there is provided a method for creating and broadcasting a multi-packet broadcast data.

In accordance with yet another aspect of the embodiments described herein, there is provided a system for receiving a broadcast data message from a remotely located information center, wherein, if the receiver determines that the vehicle is an intended recipient, the receiver recovers the message portion, stores the recovered message portion into a mail box, and stores the unique identifier into an identifier list. The recovered message portion is deleted from the mail box in response to a delete command that is received by the receiver, the delete command being specific for the recovered message portion that is associated with the unique identifier.

BRIEF DESCRIPTION OF THE DRAWINGS

FIG. 11 is a block diagram of a header for a single-packet message;

FIG. 12 is a block diagram of a header for a multi-packet message;

FIG. 13 is a block diagram of a packet type field for the headers of FIGS. 11 and 12.

DETAILED DESCRIPTION OF THE PREFERRED EMBODIMENT

In accordance with one aspect of the embodiments described herein, there is provided a system and method for broadcasting of messages that are targeted for a single vehicle or a single type of vehicle. In particular, the present invention is directed to a system and method for the targeted transmission of broadcast messages to specific vehicle operators.

Figure 1:
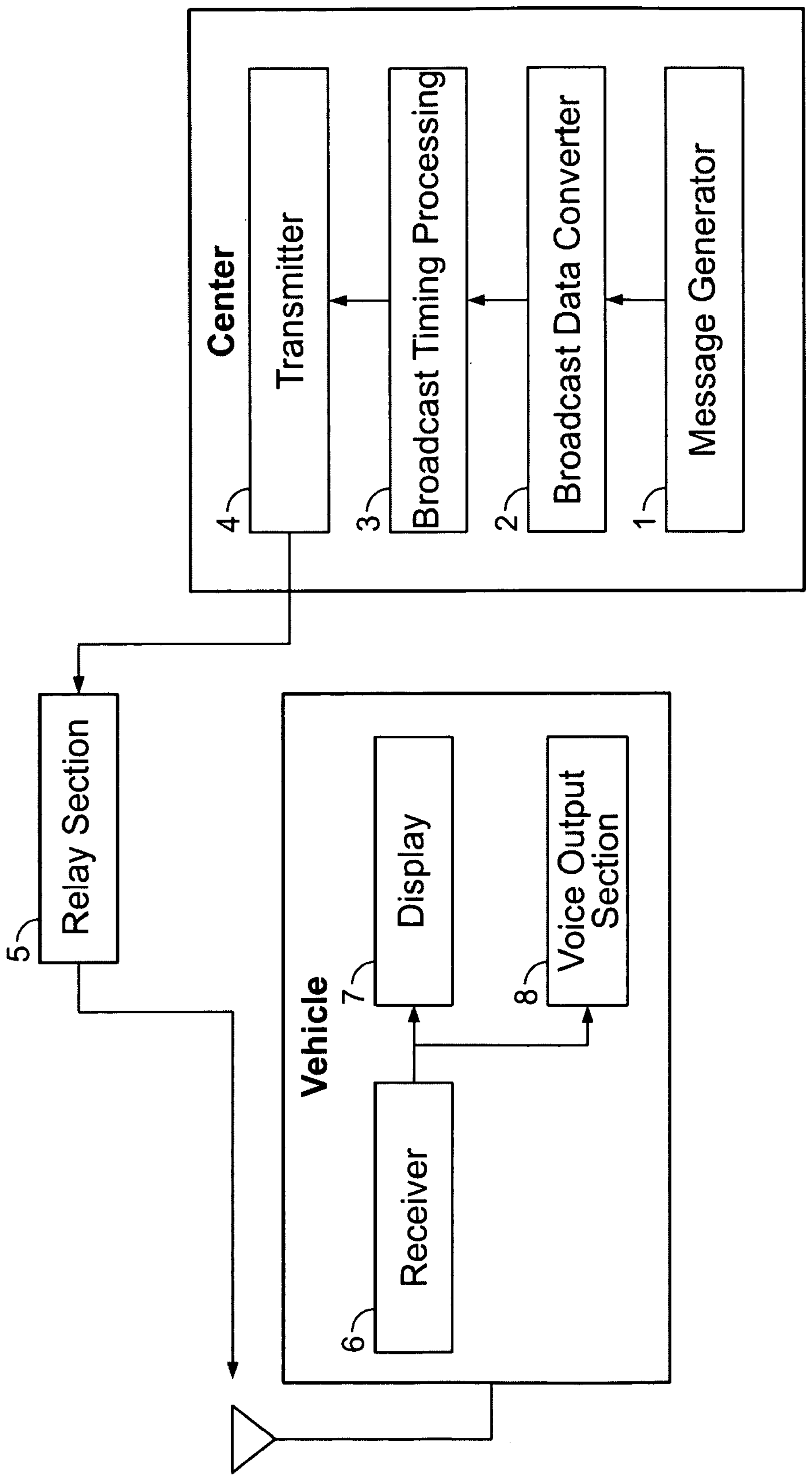
FIG. 1 is a schematic diagram of a system for communicating broadcast messages to a vehicle pursuant to aspects of the invention.

Referring now to FIG. 1, a schematic diagram of the present information provision system for a vehicle is shown according to an embodiment of the present invention. Broadcast messages originate at a remote location referred to herein as a center. The center communicates the broadcast message via a relay section 5 to each vehicle. The medium for communicating the broadcast messages may include a one-to-many communication system that can send information from one source to a plurality of receivers. Examples of suitable one-to-many communications systems include television, radio and satellite networks. In one embodiment, the relay section 5 comprises the XM Radio satellite network, which includes a network of broadcast towers, satellite servers and satellites. The broadcast messages can also be transmitted to the vehicle over a wireless communication network, such as a high bandwidth GPRS/1XRTT channel. In one embodiment, the high bandwidth channel supports data rates of about 45 Kbps to about 125 Kbps. In another embodiment, the high bandwidth channel supports data rates of about 56 Kbps to about 114 Kbps. If the high bandwidth channel is unavailable, a low bandwidth channel (e.g., a DTMF channel) can be used. In one embodiment, the low bandwidth channel supports data rates of about 1 Kbps to about 120 Kbps. In another embodiment, the low bandwidth channel supports data rates of about 30 Kbps to about 90 Kbps.

The center includes a message generator 1 for generating message data for the provision of information to the vehicle operator, a broadcast data converter 2 for converting the generated message into a broadcast data format, a broadcast timing processing section 3 that determines the timing for sending message data converted into broadcast data by the broadcast data converter 2, and a transmitter 4 for transmitting from the center the broadcast data sent from the broadcast timing processing section 3. The relay section 5 receives the broadcast data and relays it to the vehicle. It should be appreciated that the message generator 1, broadcast data converter 2, and/or broadcast timing processing section 3 may be provided by computer servers having associated memory. These servers may further include capacity to maintain data records corresponding to the vehicles and vehicle operators to which the center communicates. The broadcast data may include, for example, information related to the vehicle user such as sales campaign periods for dealers and the like, specific regional information, seasonal information, inspection periods, recall information, and lease periods, and information dispatched in accordance with need from the center, and the like. The center may also be in communication with information providers such as vehicle dealers, repair/maintenance facilities, and other service providers by way of conventional communications networks. A plurality of user profiles may be included in a user profile database, which, along with other vehicle-related information, is stored in memory at the center.

The vehicle includes a receiver 6 that is capable of receiving broadcast data relayed from the relay section 5 via a suitable antenna. The receiver 6 includes processing capability to recover or extract the broadcast data and communicate that information to a display 7 (i.e., text display device) and to a voice/audio output section or device 8 (i.e., voice message output device or speaker). The display 7 may comprise the visual display of a navigation device, or the like. The voice output section 8 may comprise the speaker of an audio device.

Figure 2:
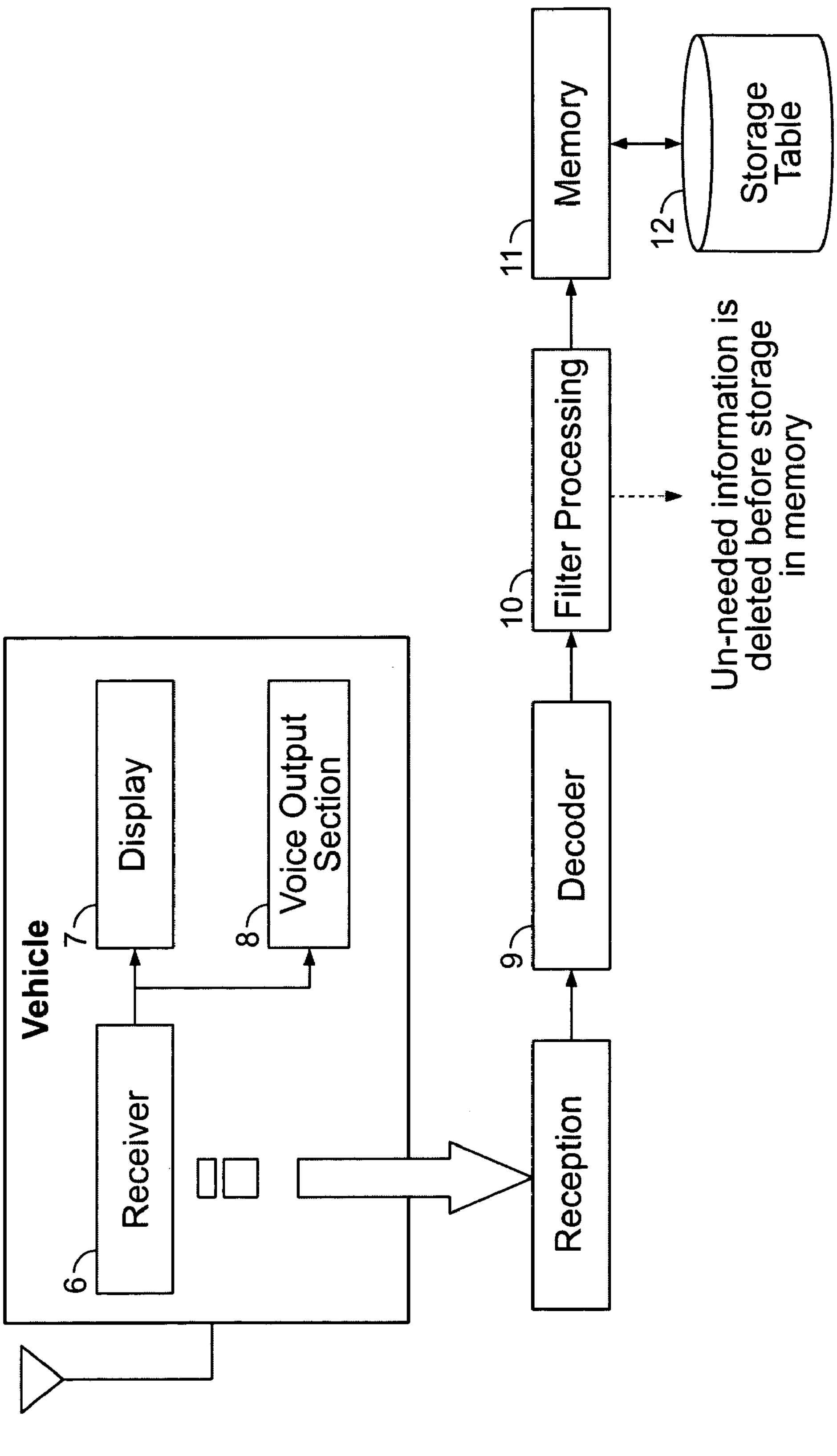
FIG. 2 is a schematic diagram of an exemplary vehicle information receiver of the system.

FIG. 2 illustrates the components of the receiver 6 in greater detail, which includes a decoder 9, a filter processing section 10, and a memory 11. The broadcast data received by the receiver 6 is decoded by decoder 9 to separate the data according to the broadcast band into broadcast data from the center and general broadcast data from the relay section 5. The memory 11 stores the broadcast data processed by the filter processing section 10. This memory 11 may comprise a storage medium, such as a hard disk, solid state memory, or other suitable memory. The filter processing section 10 permits management of the stored message packets, as will be further described below. For example, in one embodiment, un-needed information is deleted before storage in memory 11.

As will be further described below, the center generates messages for broadcast to the vehicles having a number of alternative formats. In a first such format, a single broadcast message includes a plurality of individual message components that are each intended for specific vehicles. Each vehicle receives the entire broadcast message, and filters out the message components that are directed to other vehicles, thereby storing only the message components that are applicable to that vehicle. In another such format, the broadcast message is not intended for a specific vehicle, but rather for a class of vehicles that are a subset of the entire universe of vehicles. The broadcast message includes filter data that specifies characteristics of the intended message recipients, such as identifying the vehicle make, model, year, geographic location, and other characteristics of the particular vehicle operator (e.g., having specific lease termination dates). Each vehicle receives the broadcast message, and uses the filter data to determine whether the message components are applicable to that vehicle.

Figure 3:
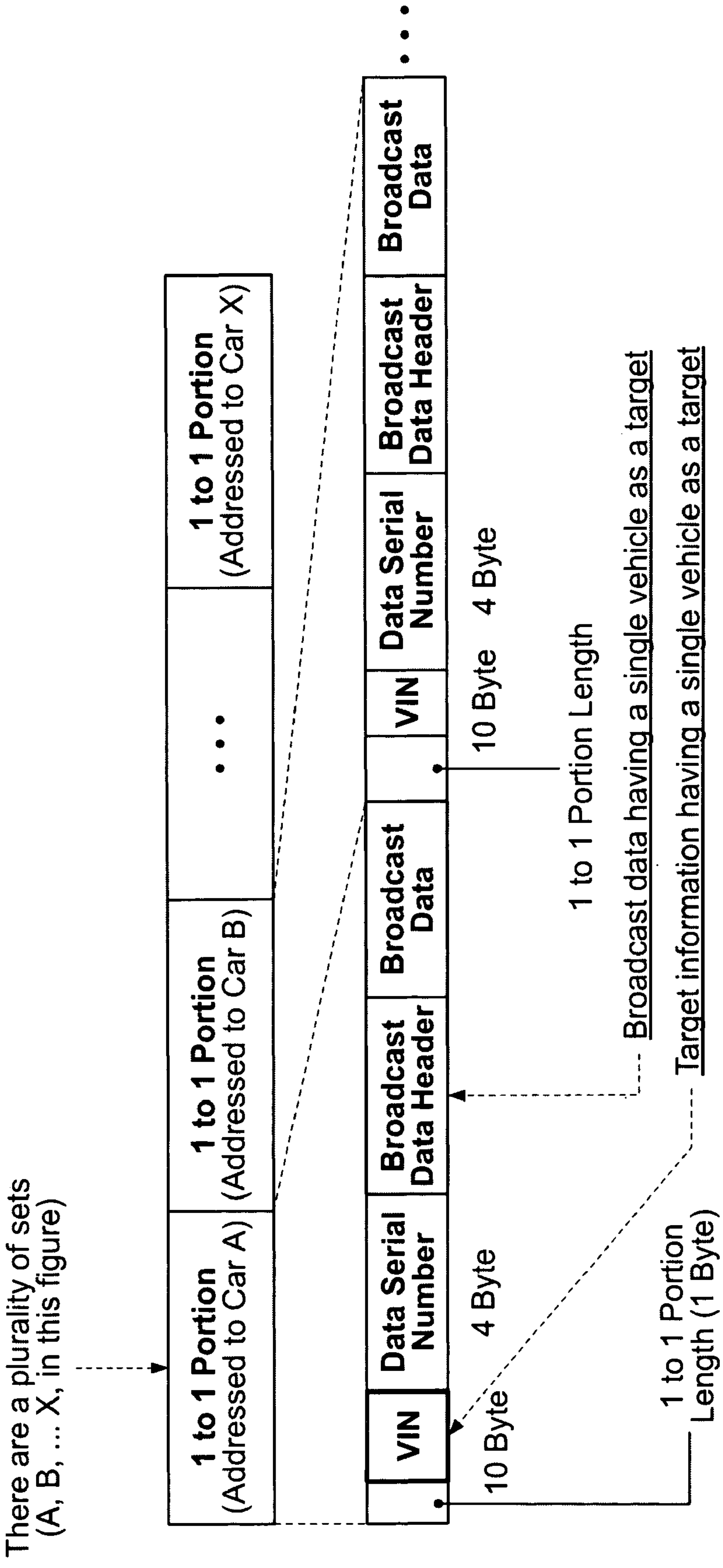
FIG. 3 is a block diagram of a multi-packet broadcast data message that includes target information that identifies a single vehicle as the target recipient.

FIG. 3 is a block diagram of an exemplary broadcast data message that includes target information that identifies a single vehicle as the target recipient. More specifically, the broadcast data message comprises a string of individual message components (each identified as a 1-to-1 portion or a one-to-one portion) that are each directed to individual vehicles. The broadcast data message may include a large number (e.g., hundreds or thousands) of these 1-to-1 portions that are each directed to individual vehicles (identified as Car A, Car B . . . Car X). In one embodiment, the one-to-one portions are concatenated to create one string of data, wherein particular portions/packets of the data are directed to the individual vehicles.

The individual 1-to-1 portions are further shown broken down in FIG. 3 as including the following fields: VIN, Data Serial Number, Broadcast Data Header, and Broadcast Data. The VIN is the vehicle identification number, which as known in the art uniquely identifies every production vehicle. The Data Serial Number field provides a unique identifier for the particular message portion. Each individual vehicle may receive plural messages, and the Data Serial Number provides a way to distinguish between the received messages. The Broadcast Data Header provides additional information regarding the message portion. Lastly, the Broadcast Data provides the body of the message being communicated, e.g., the text of the message intended to be received by the vehicle operator.

This embodiment of the present invention uses the VIN to identify the specific vehicle to which the message is targeted. Each vehicle receives the entire broadcast data message and the filter processing section 10 uses the VIN to identify message portions that are intended for the vehicle. Message portions that are not intended for the vehicle are discarded by the filter processing section 10. The intended messages are then stored in the memory 11 and indexed in accordance with the Data Serial Number. The Broadcast Data Header provides instructions about the manner and timing of presentation of the Broadcast Data to the vehicle operator.

Figure 4:
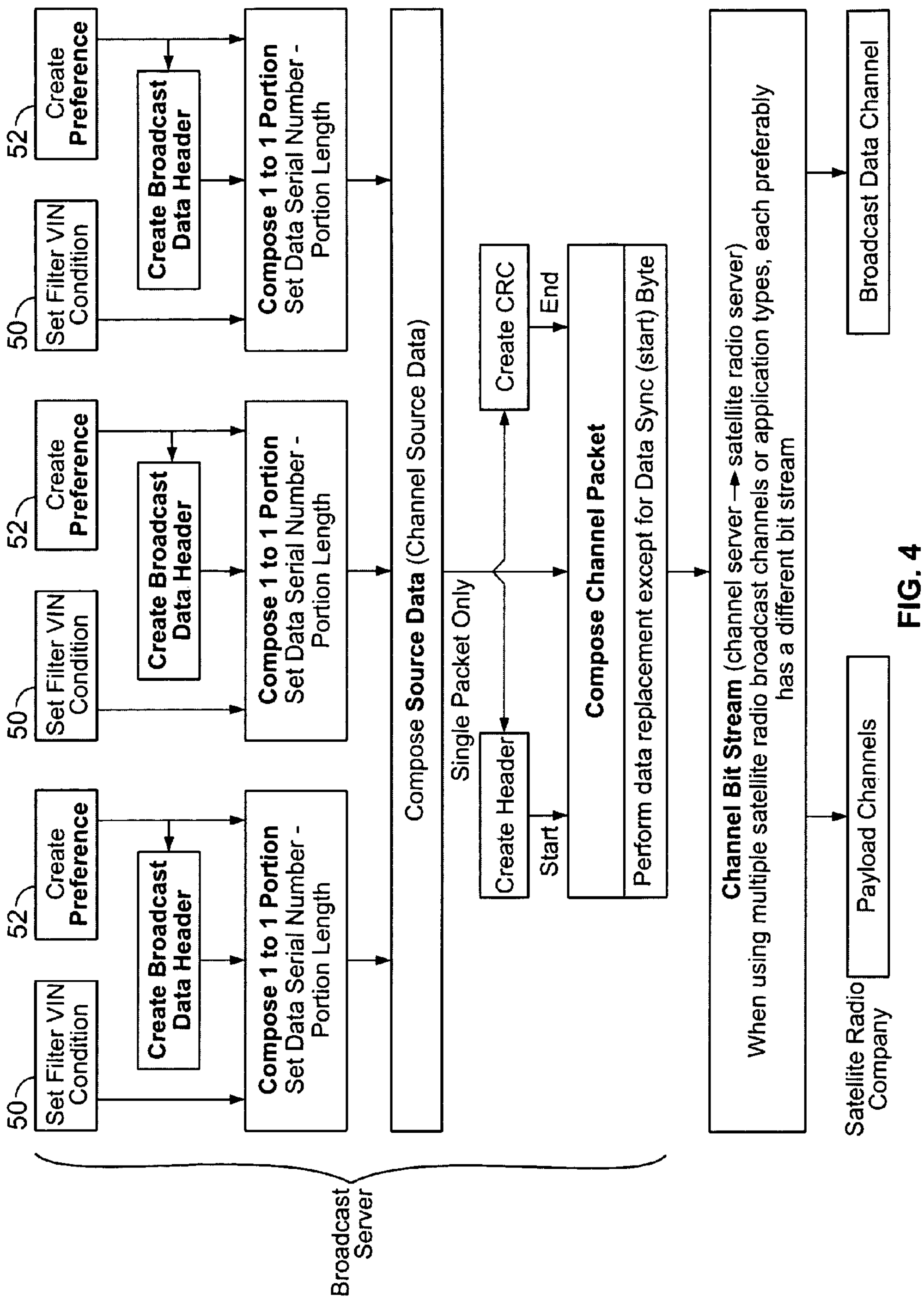
FIG. 4 is a flow diagram illustrating a method for creating and broadcasting a multi-packet broadcast data message.

FIG. 4 is a flow diagram illustrating a method for creating and broadcasting a multi-packet broadcast data message in the form described above with respect to FIG. 3. The method is executed in part by the message generator 1 of the center, and is also executed in part by the relay section 5 (both shown in FIG. 1). Each of the one-to-one message portions discussed above are generated in the blocks that are replicated as shown at the top of FIG. 4. A filter condition is set for the message, which defines vehicles that are intended to receive the message portion. As discussed above, the VIN serves as a filter condition by identifying the specific vehicle to which the message is targeted. Other filter conditions can also be selected, as will be further discussed below. Preferences for the message portion are also created, which defines the manner in which the message is delivered to the vehicle operator, and these preferences are used to create the Broadcast Data Header. The filter condition, preference, and Broadcast Data Header are used to compose the body of the message portion, and the replicated processes all feed the composed message portions into a common process for composing a combined message, referred to as Channel Source Data. The Channel Source Data is then formed into a message for communication with a header and cyclic redundancy code (CRC).

The message is then passed from the center to the relay section 5, which may be provided by the XM Radio satellite network as discussed above. The relay section 5 formulates the message into a data format suitable for broadcast to the vehicles. For example, different channels of the broadcast spectrum may be adapted to carry different formats of the broadcast message.

With continued reference to FIG. 4, there are illustrated three one-to-one portions. It will be understood that there can be more or less one-to-one portions depending on the particular application. By setting the filter condition (e.g., a VIN that is-a unique identifier for a given vehicle) (step 50) the target information can be directed to a single vehicle as a target. By creating a preference, it is possible broadcast data that is targeted to a single vehicle (step 52).

Figure 5:
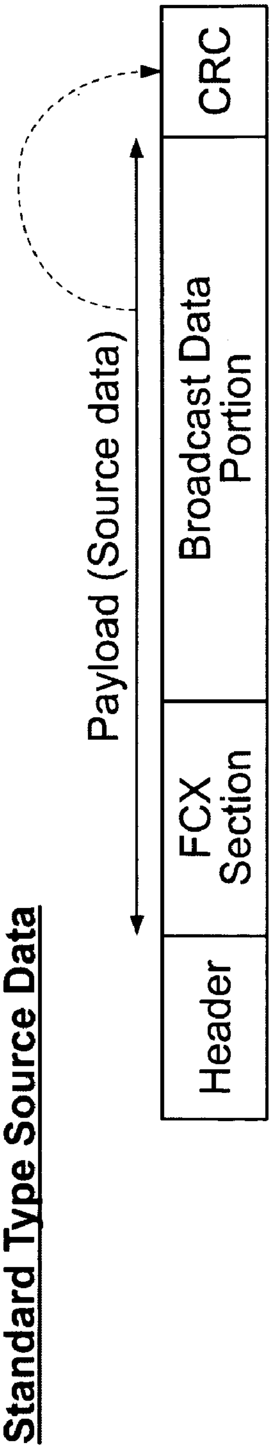
FIG. 5 is a block diagram of an embodiment of a single-packet broadcast data message.

FIG. 5 is a block diagram of an embodiment of a single-packet broadcast data message. Unlike the broadcast data message discussed above with respect to FIG. 3, the data message of FIG. 5 contains a single broadcast data portion that is intended for a plurality of vehicles in accordance with certain criteria as defined by a filter code section (FCX). For example, the filter code section may define certain characteristics of vehicles to which the message applies, such as vehicle type, model year, mileage, sales zone, etc. VIN code may also be used. For example, the filter code section may identify all 1999 Acura RL models operating in Los Angeles, Calif., having more than 50,000 miles. All vehicles receiving broadcasts from the center would receive the same broadcast data message. The filter processing section 10 in the vehicle would use the criteria defined in the filter code section to determine whether to present the data message to the vehicle operator or to discard the data message. The data message includes a header, a payload section, and a CRC code.

The payload section, which is between the header and the CRC code, includes the filter section and the broadcast data. The CRC code may be generated using any suitable algorithm, such as, but not limited to, the following polynomial:

$$G(X)=X^{16}+X^{15}+X^{2}+1$$

It should be appreciated that when the same message data is broadcast to plural vehicles of a common group, and when there are large numbers of target vehicles in the target group, the overall data amount is small (i.e., the broadcast efficiency is high). The payload section may include one set of broadcast data or multiple sets of broadcast data. It will also be understood that the CRC code is merely exemplary, and that any other suitable method of checking for errors in the data message can be implemented with the present invention.

Figure 6:
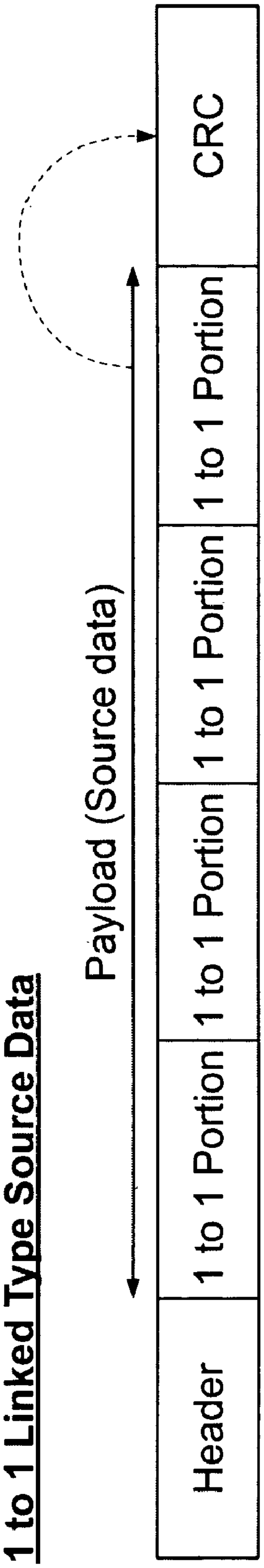
FIG. 6 is a block diagram of an embodiment of a multi-packet broadcast data message.

FIG. 6 is a block diagram of an embodiment of a broadcast data message containing 1-to-1 linked type source data. As discussed above with respect to FIG. 3, the data message of FIG. 5 contains a plurality of message portions. Each message portion may be intended for a single vehicle, using the VIN code as the filter code section. The data message includes a header, a payload section, and a CRC code. The payload section includes the 1-to-1 linked source data. Since different data is being broadcast to each vehicle, the overall quantity (i.e., the average data quantity times the number of vehicles) tends to be large (i.e., the broadcast efficiency is degraded).

Figure 7A:
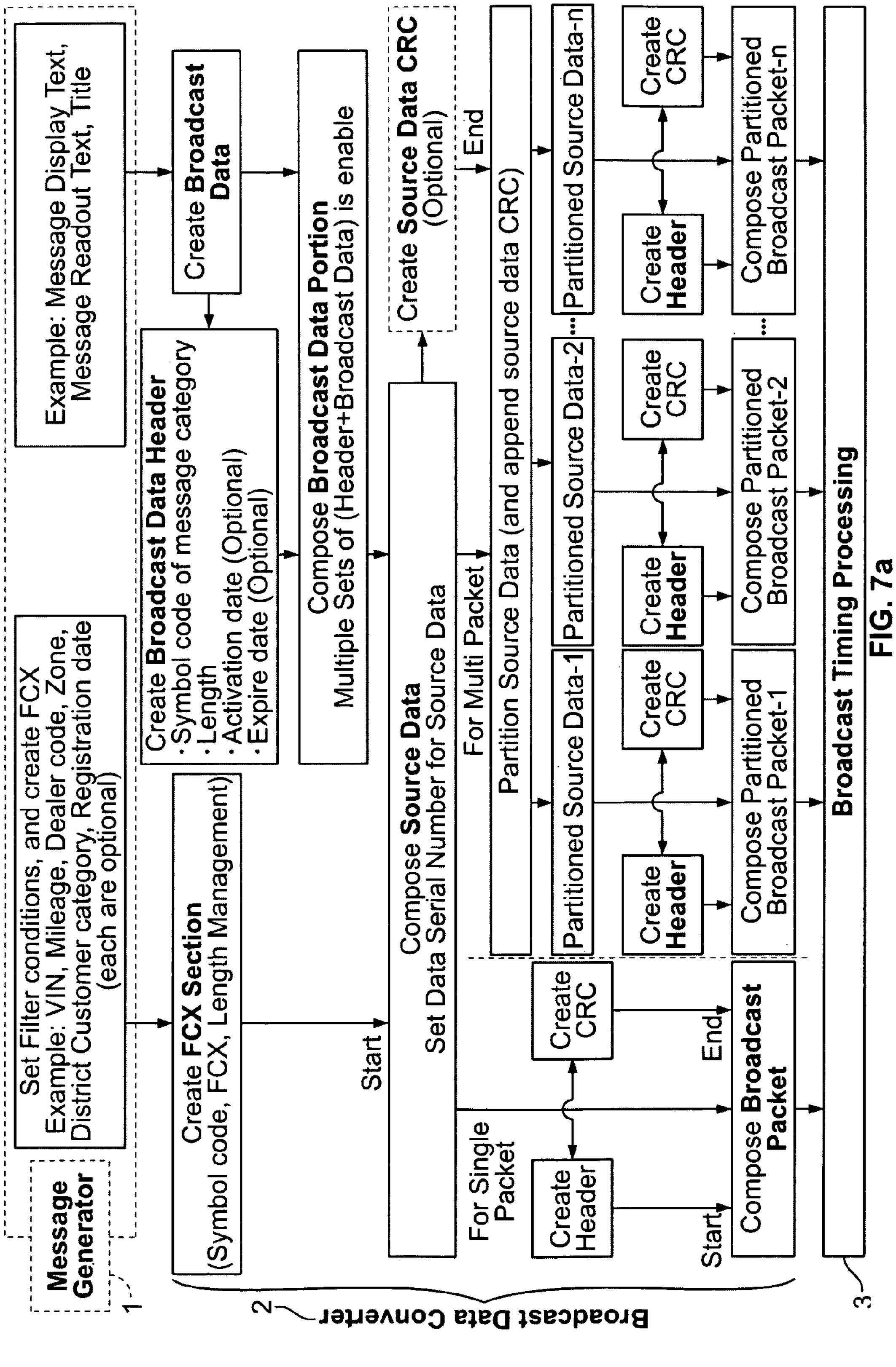
FIG. 7*a* is a flow diagram illustrating a method of creating and broadcasting a broadcast data message.

FIG. 7*a* is a flow diagram illustrating a method for creating and broadcasting a broadcast data message in the form described above with respect to FIG. 5. The method is executed in part by the message generator 1 of the center, and is also executed in part by the relay section 5 (both shown in FIG. 1). At the message generator 1, message data is created, wherein the message data comprises a message display text, message readout text, title, and a filter code section. The message filtering criteria are set according to any number of conditions, such as VIN, mileage, dealer code, zone, district, customer category, etc. The selected filter conditions are then used to generate the filter code section (FCX) of the message data, and ultimately the broadcast data message.

Figure 7B:
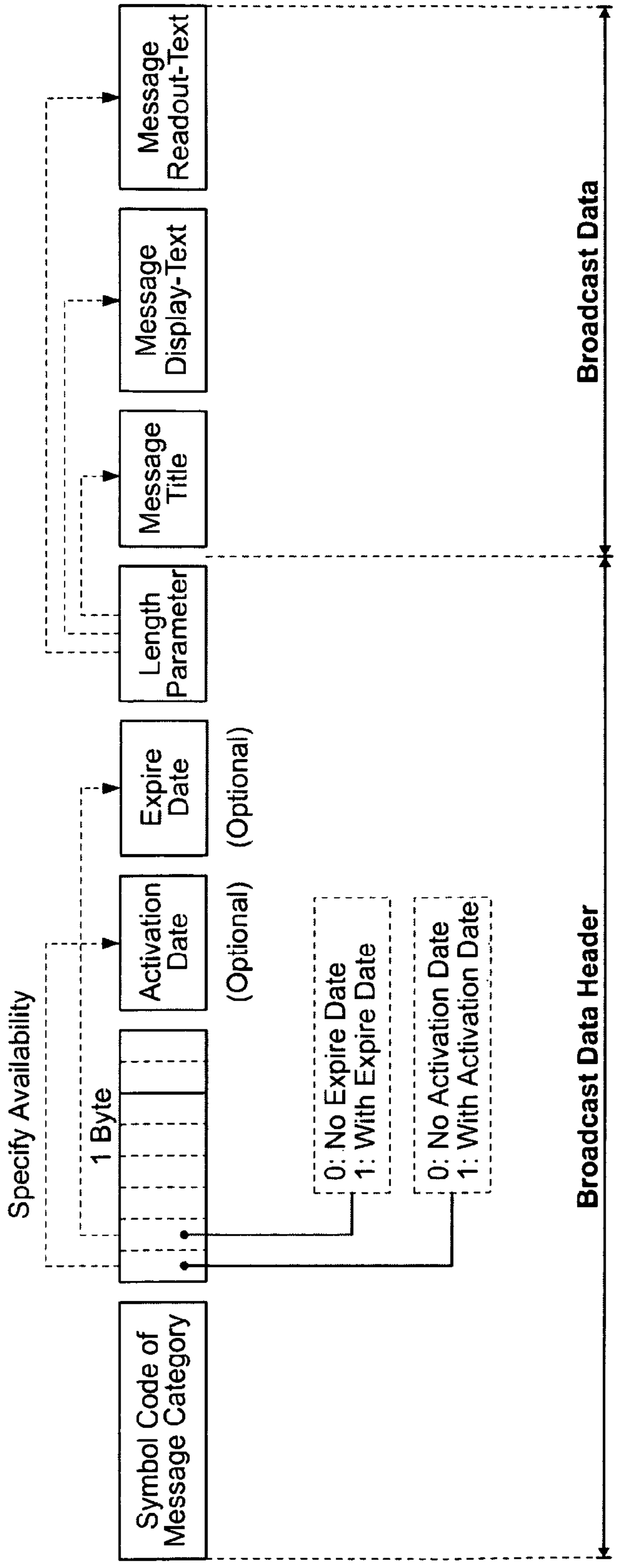
FIG. 7*b* is a block diagram of an embodiment of a broadcast data message created according to the method shown in FIG. 7*a;*

The message data is sent to a broadcast data converter 2. The converter 2 converts the message data into broadcast data and creates a broadcast data header based on the incoming message data characteristics. With reference to FIG. 7*b*, in one embodiment, the contents of the message data include message title data, message display-text data, and message readout-text data, which are converted into the broadcast data by the broadcast data converter 2. The converter 2 sets the parameters of the broadcast data message, such as the length, the activation date (i.e., when the message will be first shown to the operator), the expiration date (i.e., when the message will be deleted from a message storage device on the vehicle), and a symbol code indicating the message category or type. The aforementioned message parameters are typically encoded or stored in the broadcast data header. The converter 2 receives the FCX of the message data and creates a FCX section for the broadcast message data. The FCX section and the broadcast data portion are then fed into a common process for composing a combined message, referred to as Source Data.

Depending on the length of the message body, the broadcast message may be a single packet or multiple packets in length. For a single packet message, a header and CRC code is created and added to the Source Data to produce the Broadcast Packet. Alternatively, for a multiple packet message, the message body is partitioned into sections and each section has a header and CRC code added thereto. Separate Broadcast Packets are produced from each section. Whether a single packet message is created or a multiple packet message is created, the message is then passed from the center to the relay section 5, which may be provided by the a satellite network (e.g., XM Satellite Radio) or the like, as discussed above. The relay section 5 formulates the message into a data format suitable for broadcast to the vehicles. For example, different channels of the broadcast spectrum may be adapted to carry different formats of the broadcast message.

Figure 8A:
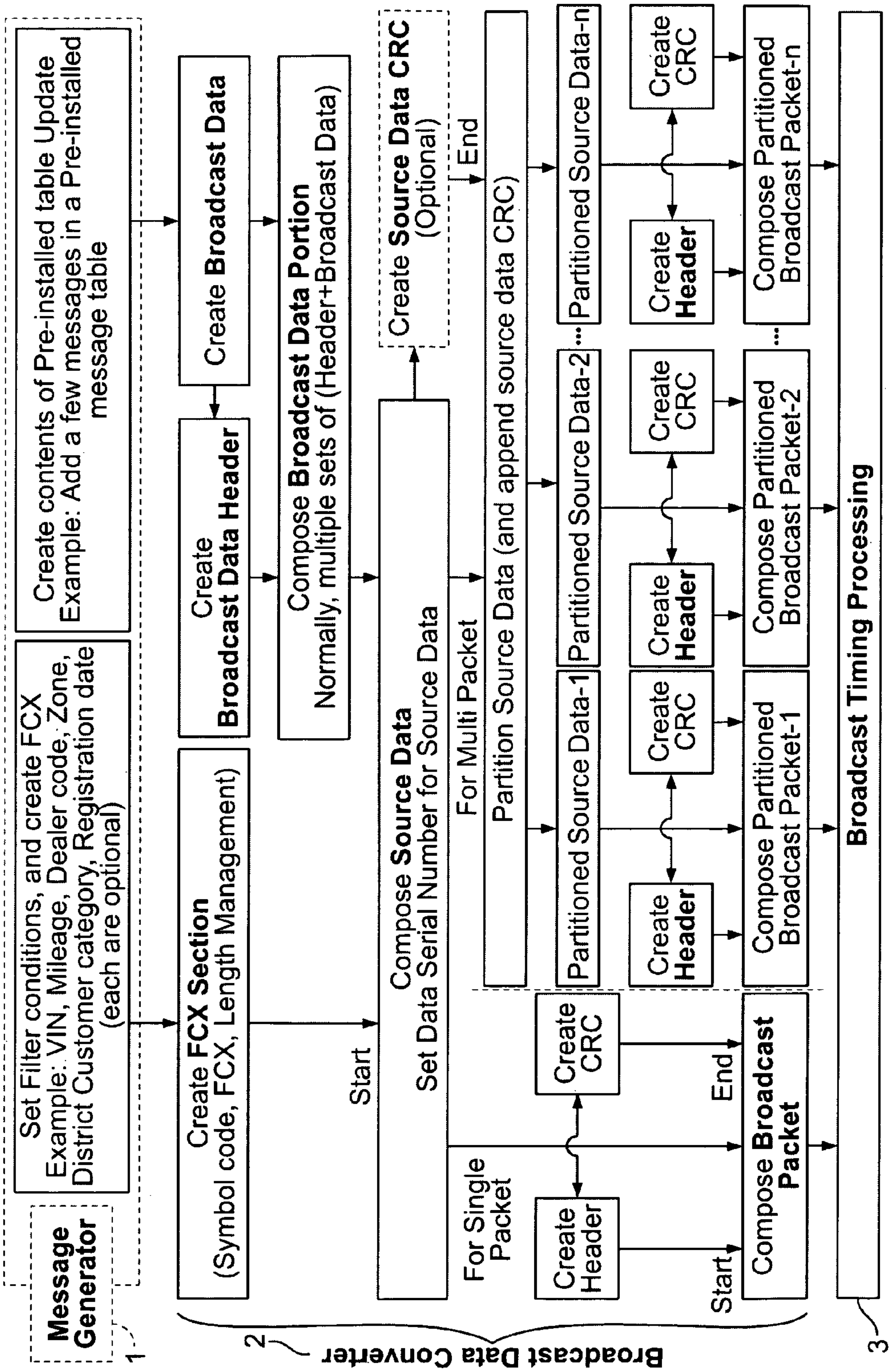
FIG. 8*a* is a flow diagram illustrating a method of creating and broadcasting an automatic update for a broadcast data message.

FIG. 8*a* is a flow diagram illustrating a method of creating and broadcasting an automatic update for a broadcast data message. The method shown in FIG. 8*a* is substantially the same as that described above with respect to FIG. 7*a*, except that the message body generated pertains to a previously transmitted message. The automatic update feature is typically used when a previously broadcasted message contains errors or if there is additional information pertaining to the previous message. The broadcast data header will contain data fields that alert the filter processing section 10 that the message pertains to a previously broadcasted message, thereby enabling the filter processing section to edit or replace the message stored in memory prior to presentation to the vehicle operator.

As with the method of creating a broadcast data message outlined in FIG. 7*a*, the method shown in FIG. 8*a* involves receiving a message and converting the received message into a format that is broadcast to the targeted recipients. In one embodiment, the pre-installed message referenced in FIG. 8*a* can be a daily message function that advises a vehicle operator with one message per day. One or more update-messages can be added to a pre-installed message table. The converter 2 receives the FCX of the update-message and creates a FCX section for the broadcast update-message. The FCX section and the broadcast data portion are then fed into a common process for composing a combined message, referred to as Source Data.

Figure 8B:
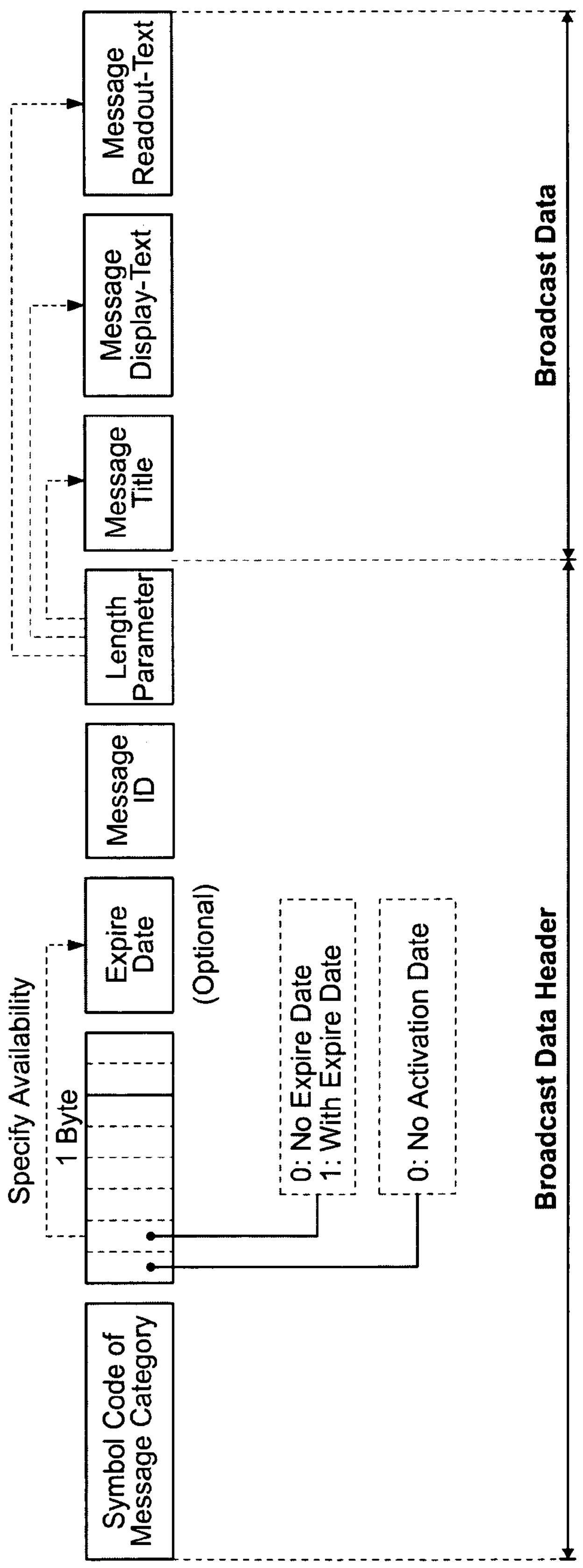
FIG. 8*b* is a block diagram of an embodiment of an update-message created according to the method shown in FIG. 8*a;*

With reference to FIG. 8*b*, in one embodiment, the broadcast data message comprises the title data, the display-text data, and the readout-text data. The broadcast data converter 2 sets the length parameter, a message ID that specifies the message's line number in the pre-installed table, the expiration date, and a symbol code that indicates the message category (e.g., Feature Guide). The parameters of the broadcast data message are coded or stored in the broadcast data header. The present update-function involves updating the table content immediately after the broadcast reception process. As such, activation date parameter is not specified. Again, the broadcast message can be a single packet or multiple packets in length, depending on the length of the message body, as explained in further detail above with respect to FIG. 7*a*.

Figure 9:
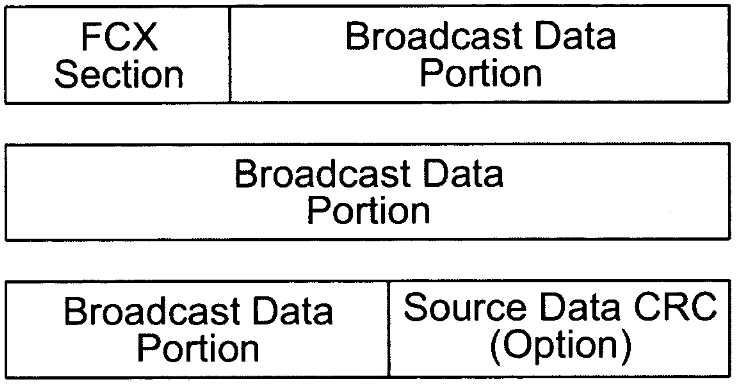
FIG. 9 is a block diagram of a multi-packet message partitioned into multiple parts.
Figure 10:
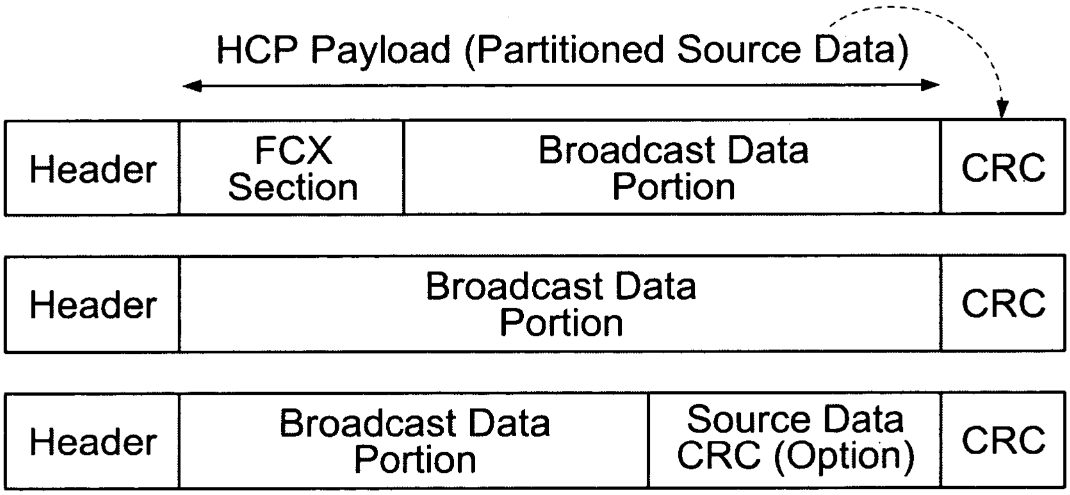
FIG. 10 is a block diagram of the multi-packet message of FIG. 9 with header and cyclic redundancy codes added.

FIG. 9 is a block diagram of a multi-packet message partitioned into multiple parts as generated by the process described above with respect to FIG. 7. As discussed above, when the source data of a broadcast data message is long, it may be divided into multiple parts for broadcast. In FIG. 9, a broadcast data message is broken into three parts, in which the first part (top) includes the filter code section (FCX) and the beginning of the broadcast data portion, the second part (middle) includes a continuation of the broadcast data portion, and the third part (bottom) includes a further continuation of the broadcast data portion followed by the CRC data. Referring now to FIG. 10, the multiple parts of the message from FIG. 9 are formulated into separate messages for broadcast, by appending a header to the beginning of each portion and a CRC code to the end of each portion. Each of the separate messages would have a common Data Serial Number in the header so that the filter processing section 10 can recognize the relationship between the messages and thereby reconstruct the original source data.

It should be appreciated that the use of the source data CRC can ensure reliability of reconstruction of the multiple partitioned source data. But, the source data CRC also takes up data space that reduces the broadcast efficiency of the message. Accordingly, the source data CRC could be used selectively for instances in which high reliability is necessary or large data files are being broadcasted. The use of a CRC code with each message in FIG. 10 would provide sufficient data reliability for instances in which a source data CRC is not utilized.

FIG. 11 is a block diagram of an exemplary header for a single-packet message, showing the fields within the single-packet message, as well as exemplary associated data sizes. In one embodiment, the data sizes of the fields are on order of about one to four bytes; however, it will be understood that the data sizes of the fields can be varied according to the particular application. This exemplary header may be utilized for the standard broadcast data message and the 1-to-1 linked type broadcast data message (discussed above). Likewise, FIG. 12 is a block diagram of an exemplary header for a multi-packet message, showing the fields of the message, as well as exemplary associated data sizes. The data sizes of the fields can be on order of about one to four bytes; however, the data sizes of the fields can be varied according to the particular application. Lastly, FIG. 13 is an exemplary block diagram of a packet type field for the headers of FIGS. 11 and 12. The packet type field defines the type of source data division, the size of the payload, the size of the broadcast source data, and an identifier as to whether a source data CRC is present. It should be appreciated by persons having ordinary skill in the art that various other data formats could also be advantageously utilized.

In accordance with another aspect of the embodiments described herein, there is provided a system and method for facilitating the exchange of information between a remote location and a vehicle. In particular, the present invention is directed to a system and method for the targeted transmission of broadcast messages to vehicle operators and the remote editing of the stored broadcast messages by subsequent communication of delete commands.

More particularly, a broadcast data output system is provided for outputting vehicle broadcast data including text data. The broadcast data output system includes a receiver provided in the vehicle for receiving the broadcast data, a storage/memory device for storing the received broadcast data, a text display device for displaying text data included in the broadcast data stored in the storage device, and a voice message output device for playing back audio messages included in the broadcast data stored in the storage device. The text display device may further display a portion of the text data to be converted into a voice message, or may display an entirety of the text data to be converted into a voice message.

In an embodiment of the invention, the storage device is responsive to delete messages received from the broadcast data system to delete received messages stored in the storage device.

With reference to FIG. 2, in one embodiment, the broadcast data that is received by the receiver 6 is in the form of distinct message packets that each have a unique identifier (ID). As will be further described below, the memory 11 maintains a list of received message IDs that provides an index to the received message packets. The filter processing section 10 permits management of the stored message packets. The message packets may either contain broadcast message data for presentation to the vehicle operator in the form of visual text or voice, or may contain command data to be executed by the filter processing section 10 to manage the stored message packets. The filter processing section 10 filters out and deletes un-needed information before storage in the memory 11.

Figure 14A:
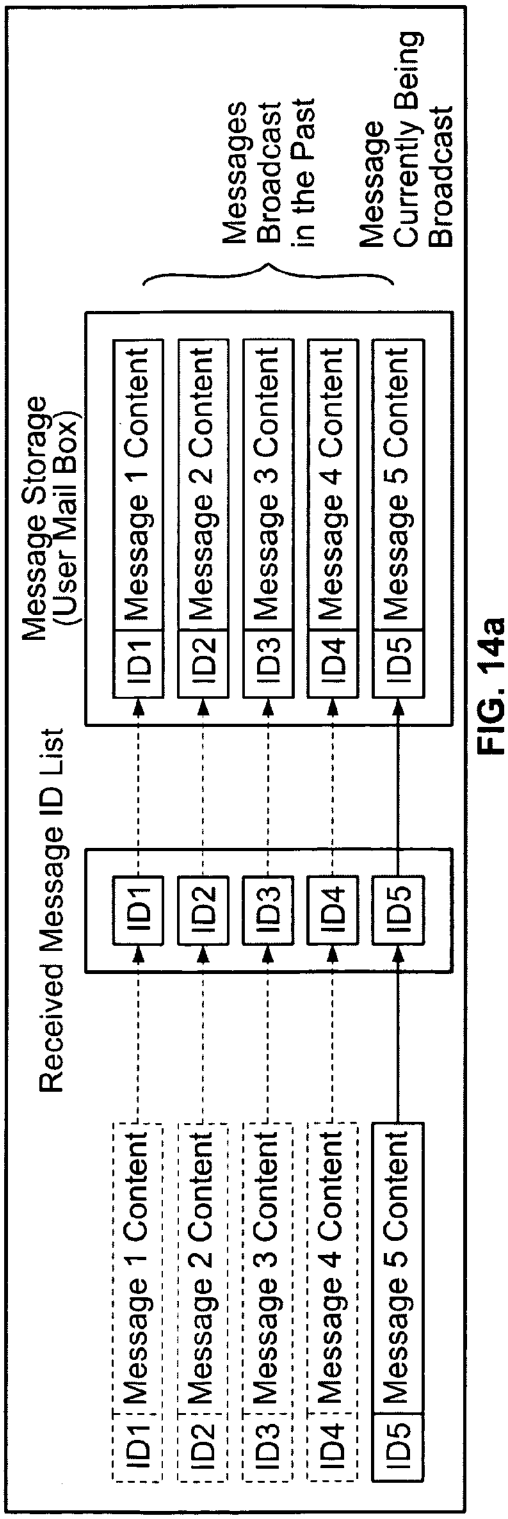
FIG. 14*a*-14*d* are schematic diagrams illustrating communication and selective deletion of broadcast messages to the vehicle operator in accordance with the present invention.
Figure 14B:
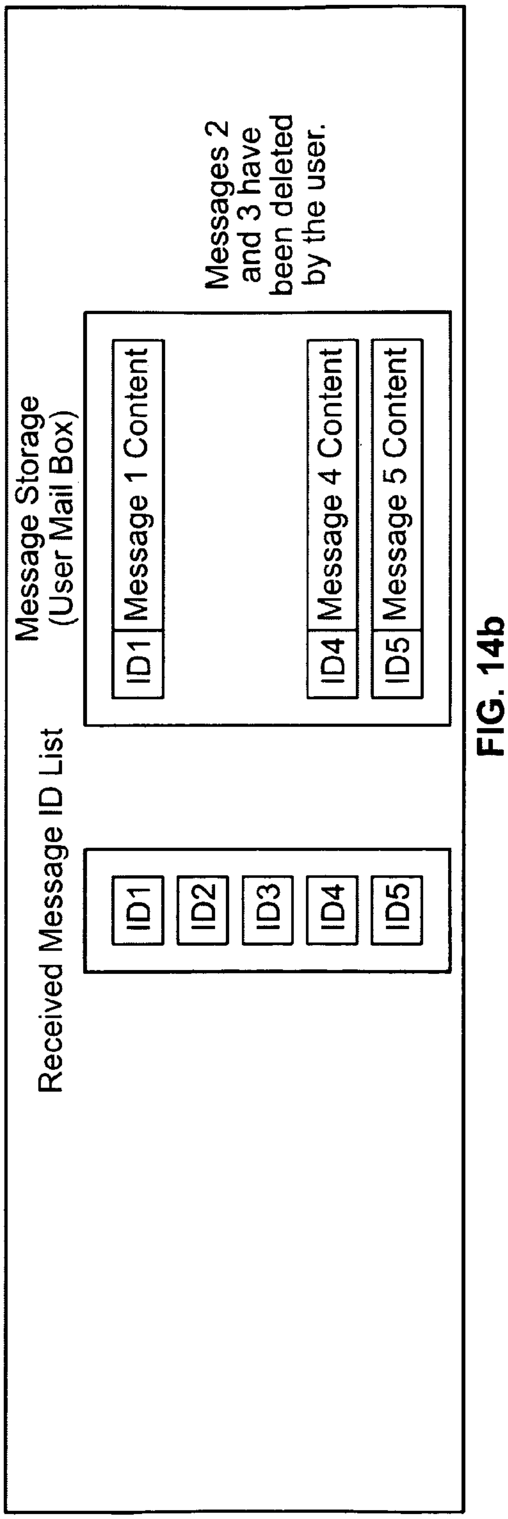

FIGS. 14*a*-14*d* illustrate the communication and selective deletion or modification/updating of broadcast messages in accordance with the present invention. Referring first to FIG. 14*a*, a plurality of messages are communicated from the center to the vehicle as discussed above. Successive messages are shown, with each message including an ID and a corresponding message content (labeled as messages 1 through 5). Messages 1 through 4 are shown in phantom, reflecting that they have been previously communicated to the vehicle, with message 5 being currently communicated to the vehicle. An ID list is maintained within the memory 11, which identifies each of the received message ID's (i.e., ID1-ID5). The received messages may also be textually displayed in a mail box shown on the display 7. The vehicle operator will have access to the mail box using control devices (such as a touch screen or pointing device) to selectively activate a received message to be presented in visual text or voice. The vehicle operator can also delete individual messages either before or after activating them. As shown in FIG. 14*b*, the vehicle operator has deleted messages 2 and 3 from the mail box. Messages 1, 4 and 5 are remaining in the mail box. Additionally, the list of received messages continues to include all five message ID's received from the center.

Figure 14C:
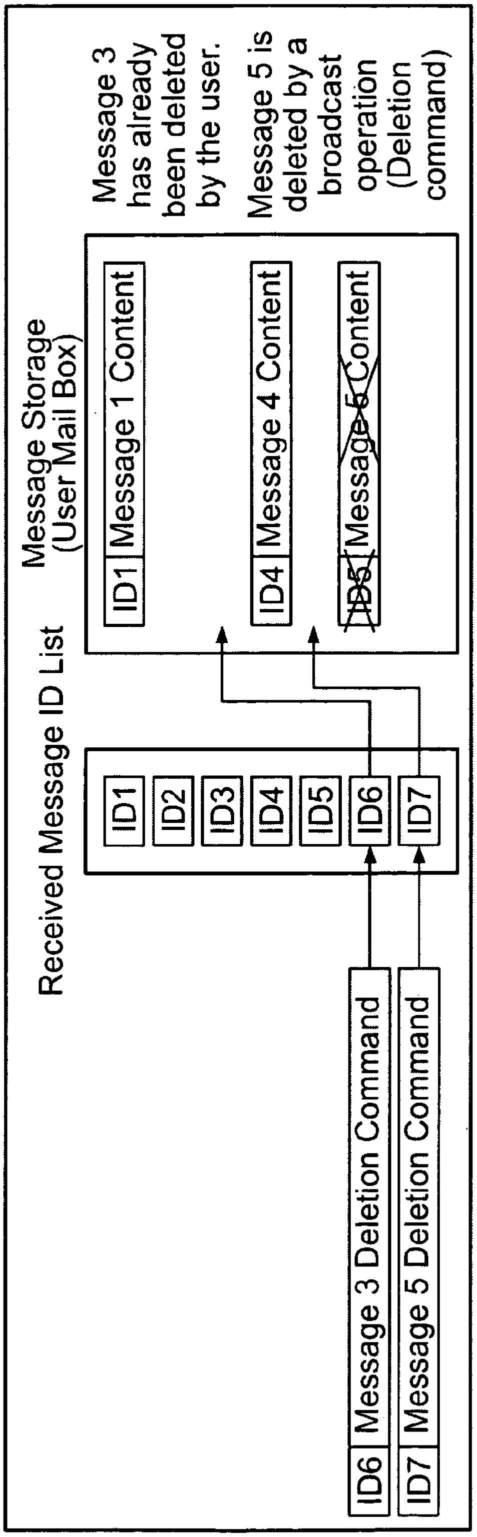
Figure 14D:
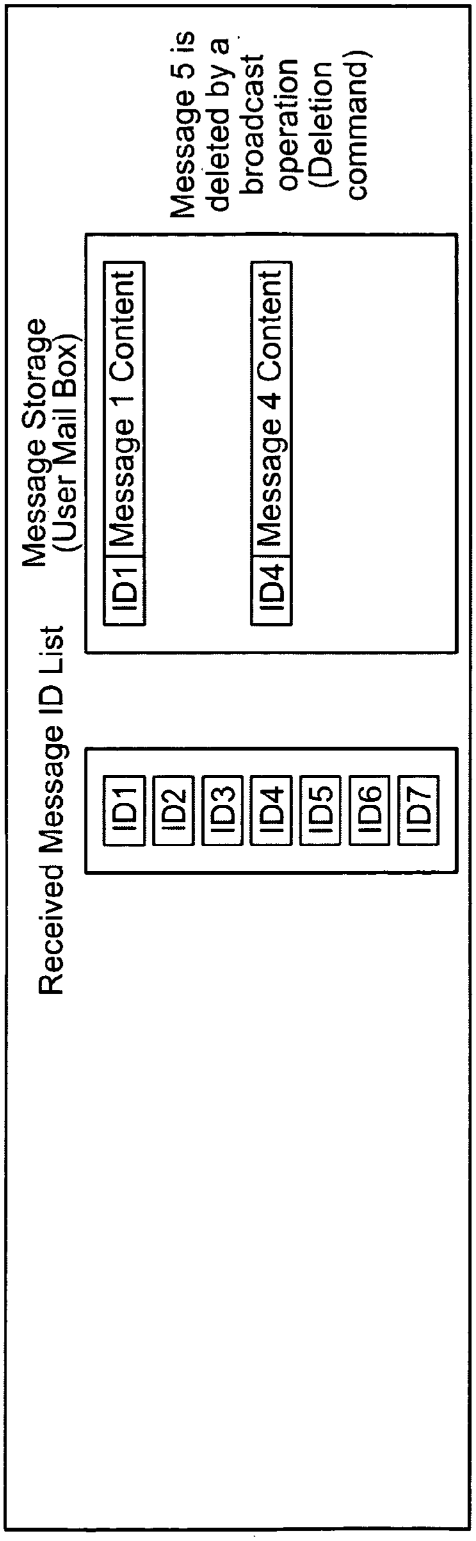

In FIG. 14*c*, the center has broadcasted two additional messages, i.e., messages 6 and 7. Each of these messages contain deletion commands. Message 6 commands the deletion of message 3, and message 7 commands the deletion of message 5. These messages may be sent upon a determination by the center that the original message contains incorrect information, or if the information has become stale or otherwise not needed. The filter processing 10 adds these new ID's to the ID list, and executes the deletion commands by deleting message 5 from the mail box. As discussed above, message 3 had been previously deleted from the mail box by the user, so there is no need to execute the deletion command. Lastly, FIG. 14*d* shows the mail box after receipt and execution of the deletion commands. Only messages 1 and 4 are remaining in the mail box. All seven message ID's are remaining in the ID list.

Having thus described a preferred embodiment of a method and system for that broadcasting messages that are targeted for a single vehicle or a single type of vehicle, including a delete command permitting remote editing of the message, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A method for creating and broadcasting a multi-packet broadcast data message to a plurality of vehicles, comprising:

receiving a first data packet directed to a first vehicle having a first identity characteristic, and receiving a second data packet directed to a second vehicle having a second identity characteristic;

assigning a first data serial number to the first data packet, and assigning a second data serial number to the second data packet;

generating a first filter code section based on the first identity characteristic, and generating a second filter code section based on the second identity characteristic;

concatenating the first filter code, the first data serial number, and the first data packet to generate a first one-to-one portion, and concatenating the second filter code, the second data serial number, and the second data packet to generate a second one-to-one portion;

concatenating the first and second one-to-one portions to generate a multi-packet payload section;

concatenating the multi-packet payload section with a header to generate the multi-packet broadcast data message; and broadcasting the multi-packet broadcast data message to the plurality of vehicles via a one-to-many communication system.

2. The method of claim 1, further comprising the step of concatenating the multi-packet payload section with a cyclic redundancy code.

3. The method of claim 1, wherein the first identity characteristic comprises a first vehicle identification number.

4. The method of claim 1, wherein the second identity characteristic comprises a second vehicle identification number.

5. The method of claim 1, wherein the step of broadcasting the multi-packet broadcast data message comprises transmitting the broadcast data message over a satellite radio network.

6. A method for creating and broadcasting a single-packet broadcast data message to at least one vehicle, comprising:

receiving a data packet directed to the at least one vehicle having a characteristic;

generating a filter code section based on the characteristic;

concatenating the data packet and the filter code to generate a broadcast data portion;

concatenating the broadcast data portion with a header to generate the single-packet broadcast data message; and broadcasting the single-packet broadcast data message to the at least one vehicle via a one-to-many communication system.

7. The method of claim 6, further comprising the step of concatenating the broadcast data portion with a cyclic redundancy code to generate the single-packet broadcast data message.

8. The method of claim 6, wherein the characteristic comprises a vehicle identification number.

9. The method of claim 6, wherein the characteristic comprises vehicle make, model, and year.

10. The method of claim 6, wherein the characteristic comprises vehicle mileage.

11. The method of claim 6, wherein the one-to-many communication system transmits the broadcast data message over a satellite radio network.

* * * * *